3,149,905
PROCESS FOR DYEING OR PRINTING CELLULOSE WITH VAT DYESTUFFS CONTAINING HYDROPHILIC GROUPS
Kurt Weber, Max Staeuble, and Heinz Peter Schaub, Basel, Switzerland, assignors to Ciba Limited, Basel, Switzerland, a company of Switzerland
No Drawing. Filed Jan. 31, 1961, Ser. No. 85,973
Claims priority, application Switzerland, Feb. 2, 1960, 1,091/60; Jan. 16, 1961, 461/61
13 Claims. (Cl. 8—35)

This invention provides a process for dyeing or printing textile materials, especially textile materials of cellulose, wherein there is used a vat dyestuff which contains at least one sulfonic acid amide group of which the nitrogen atom is bound to an aliphatic chain which contains a sulfuric acid semi-ester group and contains at least three carbon atoms between the sulfuric acid semi-ester group and the amide nitrogen atom, and the dyestuff is reduced to the leuco form before or during the dyeing or printing process and the leuco-compound is oxidized on the fiber in the usual manner.

The aliphatic chain containing at least three carbon atoms which is present in the aforesaid vat dyestuffs, may be straight or branched. The chain may consist of carbon and hydrogen atoms or may be interrupted by a hetero atom, more especially an oxygen, sulfur or nitrogen atom. There are advantageously used those vat dyestuffs of which the aliphatic amide-chain contains less than 10 members, that is to say, for example, 3 to 8 $CH_2$— or —CH— groups and a hetero atom, and, if desired, a further sulfato group.

The vat dyestuffs used in the process of the invention may belong to the anthraquinone, perylene, perinone or pyrene-quinone series or to the indigoid series or phthalocyanine series, especially cobalt phthalocyanine. As examples there may be mentioned acylaminoanthraquinones, such as 1:5-dibenzoylaminoanthraquinone, a condensation product of one molecular proportion of an acid dichloride with two molecular proportions of 1-aminoanthraquinone or 1-amino-5-benzoylaminoanthraquinone. The vat dyestuffs may contain more highly condensed ring systems, such as the pyranthrone, anthanthrone, dibenzpyrene-quinone or acedianthrone, and there may be mentioned more especially amino- or nitro-dibenzanthrones or nitro- or amino-isodibenzanthrones, condensation products of aminodibenzanthrones with halogenated polycyclic compounds or mixed condensation products of aminodibenzanthrone or an aminoanthraquinone with a halogenated polycyclic compound, and also vat dyestuffs which contain fused on or fused in hetero rings, for example, indanthrone, flavanthrone, N:N-diethyl-dipyrazoleanthrone, 5-benzoylaminoanthrapyrimidine or perylene-tetracarboxylic acid diimides or perinone dyestuffs obtainable by the condensation naphthalene tetracarboxylic acid with 2 molecular proportions of ortho-phenylenediamine or dyestuffs of the formula

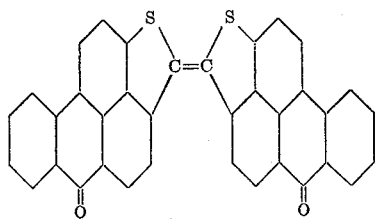

and also dyestuffs of the pyrene-quinone series. Among dyestuffs of the indigoid series there may be mentioned indigo and thioindigo.

The sulfonamide radical is advantageously bound directly to an aromatic nucleus of the dyestuff molecule.

The vat dyestuffs used in the process of the invention can be made by known methods, for example, by reacting a sulfochloride of the dyestuff which can be obtained, for example, by heating the vat dyestuff with chlorosulfonic acid, with an alkanolamine, and reacting the hydroxyalkyl-sulfonamide so obtained with concentrated sulfuric acid or chlorosulfonic acid.

The dyeing process is carried out in the presence of an alkali, especially an alkali metal hydroxide, and a reducing agent.

As reducing agents there may be used strong reducing agents, such as sodium hydrosulfite, or thiourea dioxide, or weak reducing agents, such as sodium sulfide, sodium hydrosulfide, glucose or hydrazine. The proportion of the reducing agent may vary within wide limits. In general it is sufficient to use a considerably smaller proportion of reducing agent than is necessary in dyeing with vat dyestuffs by the known methods. The dyeing may be carried out, for example, by the exhaustion method. In this case the material to be dyed is treated in a solution of the dyestuff which contains the alkali and the reducing agent, advantageously at a moderately raised temperature, more especially within the range of 20° C. to 90° C. The oxidation of the leuco-compound fixed on the fiber and the after-treatment, such as rinsing and soaping at the boil, are carried out by the methods usual in the vat dyestuff industry.

In an especially advantageous form of the process an aqueous solution of the vat dyestuff to be used is applied to the material by padding. For this purpose the material to be dyed is impregnated with the dyestuff solution in the cold or at a moderately raised temperature, and the impregnated material is squeezed in the usual manner. Advantageously the material is so squeezed that it retains 50 to 140% of its weight of dyestuffs solution. The treatment with alkali and a reducing agent is carried out after the impregnation, and advantageously after drying the impregnated material. For this purpose the treated material is impregnated with an aqueous solution containing the alkali and the reducing agent, then squeezed and steamed in order to fix the dyestuff. The after-treatment, namely rinsing with cold water, oxidation, if desired, with the addition of an oxidizing agent, for example, hydrogen peroxide or sodium borate, acidification and soaping at the boil, is carried out in the usual manner.

Instead of applying the dyestuff to the material by impregnation it may be applied by printing. In this case there is used a printing color which contains the dyestuff and the additions customary in printing with vat dyestuffs, such as potassium carbonate, hydrosulfite or rongalite, and thickening agent.

The process of the invention leads to excellent dyeings and prints on textile materials, more especially textile materials of cellulose . It has been surprisingly found that in the process of the invention the sulfuric acid semi-ester radical splits off so rapidly and completely that the normal dyeing or printing conditions such as are customary with vat dyestuffs, and alkalies of the usual kind and in the same proportion, can be used. In certain cases it may be necessary to avoid using conditions, such as an especially low dyeing temperature and/or a pH-value very close to the neutral point, which retard the splitting off of the aforesaid radical. If, nevertheless, dyeing is carred out at a low temperature, or in the case of the padding or printing process, steaming is carried out for a short time, it is desirable to carry out an after-treatment with an alkali metal hydroxide, for example, with a soap bath containing, per liter, 10 to 40 ml. of sodium hydroxide. In this manner the production of fast and full dyeings and prints is ensured.

By the process of this invention there are obtained strong dyeings or prints, which possess excellent properties of fastness, for example, a good fastness to light and a good fastness to kier boiling. As compared with the conventional methods of vat dyeing, the process of the invention has the important advantage that the dyestuffs are applied in a water-soluble form and therefore more easily vattable dyestuffs can be used. Processes are known in which vat dyestuffs containing the aforesaid sulfonamide groups are used, but without a reducing agent. The dyeings produced by these processes are considerably weaker and useless for practical purposes.

The following examples illustrate the invention, the parts and percentages being by weight:

C., of 2 parts by volume of sodium hydroxide solution of 30% strength and 1.2 parts of sodium hydrosulfite in 350 parts of water, whereupon vatting sets in spontaneously. 10 parts of cotton are dyed in the dyebath so prepared for 45 minutes at 70° to 80° C. with addition of 8 parts of sodium chloride. The dyed cotton is oxidized, washed, acidified, once more thoroughly rinsed, and soaped at the boil. A strong clear blue dyeing is obtained which has excellent properties of fastness.

When dyeing is performed at 60 to 70° C. in a dyebath which contains 6 parts by volume of sodium hydroxide solution of 30% strength and 1.2 parts of sodium hydrosulfite, without addition of sodium chloride, an identical dyeing is obtained.

The above dyestuff can be prepared by condensing dibenzanthrone disulfochloride with 4-aminobutanol and esterifying the hydroxyl groups with sulfuric acid.

Dyeing in an identical manner can be carried out with the dyestuff obtained by condensing isodibenzanthrone disulfochloride with 4-aminobutanol and esterifying the hydroxyl group wtih sulfuric acid. The resulting dyeing is of a reddish blue shade and has good properties of fastness.

EXAMPLE 2

0.75 part of the dyestuff of the formula

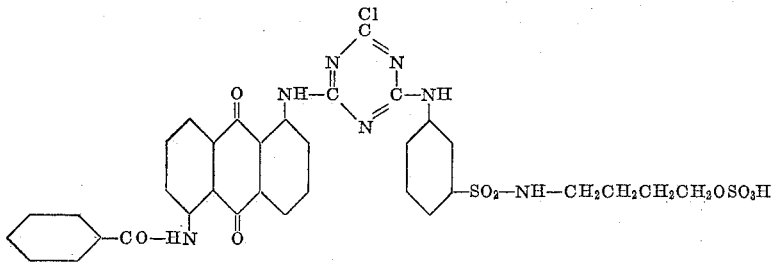

EXAMPLE 1

0.15 part of the dyestuff of the formula

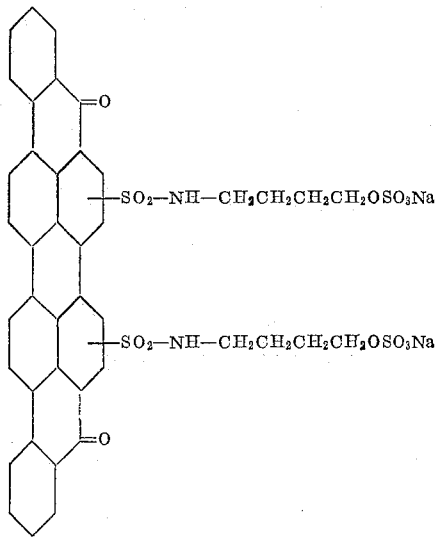

are dissolved in 50 parts of water at 70° C. The resulting blue solution is poured into a solution, heated at 70° is pasted in 250 parts of warm water. The resulting dyestuff suspension is added to a solution, heated at 50° C., of 10 parts by volume of sodium hydroxide solution of 30% strength and 6 parts of sodium hydrosulfite in 1750 parts of water, whereupon vatting sets in spontaneously. 50 parts of cotton are dyed in the dyebath so prepared for 45 minutes at 50 to 60° C. with addition of 60 parts of sodium chloride. The dyed cotton is oxidized, washed, acidified, once more thoroughly rinsed, and soaped at the boil. A yellow dyeing of good properties of fastness is obtained.

The above dyestuff is obtained by monocondensation of cyanuric chloride with 3-aminobenzene-5-hydroxybutyl sulfonamide in acetone, condensing the reaction product with 1 molecular proportion of 1-amino-5-benzoylamino-anthraquinone and esterifying the hydroxyl group with sulfuric acid.

EXAMPLE 3

0.75 part of the dyestuff of the formula

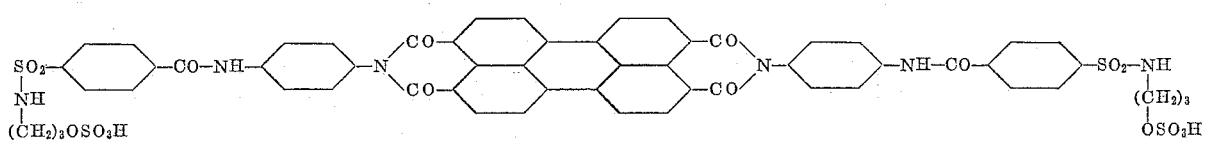

is pasted in 250 parts of warm water. The resulting dyestuff suspension is added to a solution, heated at 60° C., of 10 parts by volume of sodium hydroxide solution of 30% strength and 6 parts of sodium hydrosulfite in 1750 parts of water, whereupon vatting sets in spontaneously. 50 parts of cotton are dyed in the resulting dyebath for 45 minutes at 60 to 70° C. with addition of 60 parts of sodium chloride. The dyed cotton is oxidized, washed, acidified, once more thoroughly rinsed, and soaped, at the boil. A brilliant red dyeing of good fastness properties is obtained.

The above dyestuff can be prepared as follows:

9.8 parts of the disulfochloride of the formula

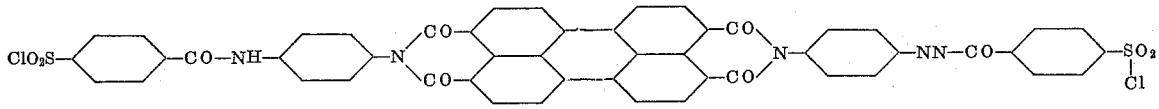

prepared from the appropriate diamine by condensing it with benzoyl chloride-4-sulfochloride in nitrobenzene are stirred in 150 parts of nitrobenzene at 120° C. 4 parts of 3-aminopropanol-(1) in 20 parts of nitrobenzene are then slowly added dropwise in the course of 1 hour, the mixture is stirred on for 4 hours at 120° C. and then for 1 more hour each at 140° C. and 180° C. After having cooled, the mixture is filtered, and the filter residue is washed successively with benzene, alcohol and water, and dried.

9 parts of the condensation product obtained in this manner are stirred into 180 parts of concentrated sulfuric acid at 0 to 5° C. and dissolved therein. The whole is then cautiously poured over ice and filtered. The moist filter cake is suspended in about 500 parts of water and neutralized with sodium hydroxide solution, then filtered and dried under vacuum at 60 to 70° C.

EXAMPLE 4

(Exhaustion Method)

5 parts of the dyestuff of the formula shown in Example 1 are dissolved at 80° C. in 100 parts of water, whereupon 5 parts by volume of sodium hydroxide solution of 40% strength and 3 parts of sodium hydrosulfite are added. 25 parts of cotton are dyed in the dyebath thus prepared for 45 minutes at 80° C. with addition of 30 parts of sodium chloride. The dyed cotton is oxidized, rinsed, acidified, thoroughly rinsed, and soaped. A reddish blue dyeing is obtained.

Instead of sodium hydrosulfite, there may be used thiourea dioxide or sodium sulfide.

EXAMPLE 5

(Pad-Jigging Method)

A cotton fabric is padded at room temperature (about 25° C.) with a solution containing in 1000 parts of water 10 parts of the dyestuff of the formula shown in Example 1, until its weight shows an increase of 80%. The fabric is then developed for 30 minutes at 80° C. in a bath containing per 1000 parts of water 100 parts of sodium chloride, 20 parts by volume of sodium hydroxide solution of 40% strength and 10 parts of sodium hydrosulfite. The dyeing is then finished as described in Example 4.

Satisfactory dyeings are also obtained when sodium sulfide or thiourea dioxide is used instead of sodium hydrosulfite.

EXAMPLE 6

(Pad-Steaming Method)

A cotton fabric is padded at 25° C. with a solution containing in 1000 parts of water 10 parts of the dyestuff of the formula shown in Example 1 until its weight shows an increase of 80%. The fabric—if desired after having been intermediately dried—is then impregnated in a bath containing in 1000 parts of water 200 parts of sodium chloride, 50 parts by volume of sodium hydroxide solution of 40% strength and 30 parts of sodium hydrosulfite. The fabric is then squeezed to a weight increase of 70 to 100%, steamed for 50 seconds, and then finished as described in Example 4.

When the fabric is steamed for 120 seconds, somewhat better results are obtained.

EXAMPLE 7

(Pad-Roll Method)

A cotton fabric is impregnated at 25° C. with a padding liquor containing per 1000 parts of water 10 parts of the dyestuff prepared as described below, 50 parts by volume of sodium hydroxide solution of 40% strength and 40 parts of Rongalit, and then squeezed to a weight increase of 80%. After having been so squeezed, the fabric is heated to 80 to 85° C. in an infra-red zone or a steaming channel, then introduced into a preferably air-free chamber maintained at 80 to 85° C., and kept there for 2 to 4 hours in the rolled-up state. Finishing follows the procedure described in Example 4.

PREPARATION OF THE DYESTUFF 50 parts of aminodibenzanthrone (nitrogen content=3.68%) are entered at room temperature with cooling in 150 parts by volume of chlorosulfonic acid, and the mixture is then heated for 2 hours at 125° C. When this internal temperature has been reached, the reaction mixture is kept for 2 hours at 125° C., during which a vigorous current of hydrochloric acid and sulfur dioxide escapes. The heating is then discontinued and the batch is cooled to 80° C. While maintaining an internal temperature of 70 to 80° C., a total of 75 parts by volume of thionyl chloride is then added dropwise. When all thionyl chloride has been dropped in, and the internal temperature is raised to 85° C., a weak reflux of thionyl chloride should be noticed. The batch is kept for about 30 to 40 minutes at this temperature, then cooled, and poured over ice. When decomposition has taken place, the mixture is suction-filtered, and the filter residue is washed with cold water until the washings display only a weak acid reaction (pH=5 to 6). The sulfochloride thus prepared is added to a solution of 200 parts of N:N-dihydroxy-ethyl-propylenediamine-(1:3) in 1000 parts of water while cooling with ice and then stirred overnight. The following morning the reaction mixture is heated for 2 to 3 hours at 50 to 60° C., then cooled to room temperature, and the dyestuff is suctioned off. The filter cake is suspended in methanol and again suction-filtered. The dried dyestuff is added with cooling to 200 parts by volume of sulfuric acid of 100% strength and the whole is stirred for several hours at 20 to 25° C., then poured over ice, suctioned off, and the ester is suspended in water and adjusted with NaOH to pH=8. The dyestuff is suctioned off and dried in a vacuum cabinet at 40 to 50° C.

EXAMPLE 8

(Single-Bath Steaming Method)

A cotton fabric is impregnated at 25° C. with a padding liquor containing per 1000 parts of water 10 parts of the dyestuff used in Example 7, 50 parts of urea, 50 parts by volume of sodium hydroxide solution of 40% strength and 40 parts of Rongalit. The fabric is then steamed—if desired after having been intermediately dried—for 5 minutes, and the dyeing is finished as described in Example 4.

EXAMPLE 9

(*Thermofixing Method*)

A cotton fabric is impregnated at 25° C. with a padding solution containing per 1000 parts of water 10 parts of the dyestuff used in Example 7, 200 parts of urea, 20 parts of potassium carbonate, 2 parts by volume of sodium hydroxide solution of 40% strength and 80 parts of Rongalit. The fabric is then heated for 5 minutes at 150° C.—if desired, after having been intermediately dried—and the dyeing is finished as described in Example 4.

EXAMPLE 10

(*Printing Method*)

A printing paste is prepared which contains 20 parts of the dyestuff of the formula

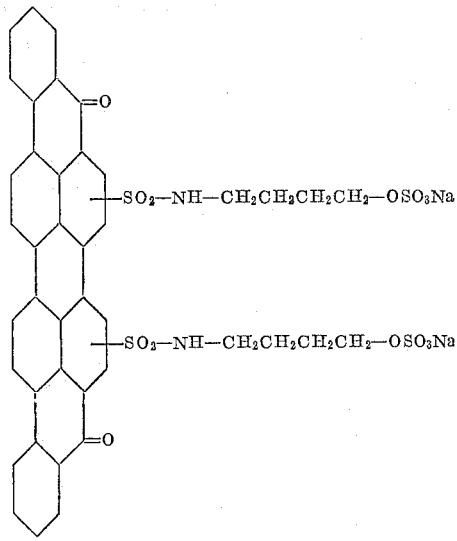

200 parts urea
238 parts of water
400 parts of sodium alginate thickening 50:1000
60 parts of potassium carbonate solution of 30% strength
2 parts of sodium hydroxide solution of 40% strength, and
80 parts of Rongalit 1000 parts The printing paste is then applied on a roller printing machine to a cotton fabric. The printed fabric is dried and steamed for 8 minutes at 100° C. in a Mather-Platt ager, and then finished as described in Example 4.

A similar, good result is obtained on spun rayon fabric.

By the method described above there is obtained a grey print with the dyestuff used in Example 7.

EXAMPLE 11

0.5 part of the dyestuff used in Example 7 is dissolved in 1000 parts of water at 80° C., whereupon 5 parts by volume of sodium hydroxide solution of 40% strength and 3 parts of sodium hydrosulfite are added. 25 parts of cotton are dyed in the resulting dyebath for 45 minutes at 80° C. with addition of 30 parts of sodium chloride. The dyed cotton is oxidized in air, rinsed, acidified, thoroughly rinsed, and soaped. A grey dyeing results.

A similar dyeing is obtained with the dyestuff prepared by sulfochlorination of aminodibenzanthrone with chlorosulfonic acid, condensation with N-methyl-N-hydroxyethyl-propylenediamine-(1:3) and esterification with sulfuric acid of 100% strength.

Similar dyeings can be obtained with the dyestuffs obtained by sulfochlorinating the dyestuffs shown in column I of the following table at the temperature listed in column III, condensing the resulting sulfochloride with the amine shown in column IV and converting the resulting sulfonamide with concentrated sulfuric acid into the sulfuric acid semi-ester. The shades thus obtained are listed in column V.

| | I | II N-content in percent | III ° C. | IV | V |
|---|---|---|---|---|---|
| 1 | Nitrodibenz-anthrone. | 3.68 | 130 | N:N-dihydroxy-ethyl-propyl-enediamine-(1:3). | Grey. |
| 2 | Aminodibenz-anthrone. | 3.68 | 120 | ---do--- | Do. |
| 3 | ---do--- | 3.68 | 130 | ---do--- | Do. |
| 4 | ---do--- | 3.68 | 140 | ---do--- | Do. |
| 5 | ---do--- | 3.55 | 125 | ---do--- | Do. |
| 6 | ---do--- | 3.7 | 125 | ---do--- | Do. |
| 7 | ---do--- | 3.88 | 125 | ---do--- | Do. |
| 8 | Nitrodibenz-anthrone. | | 130 | N-methyl-N-hydroxyethyl-propylenediamine-(1:3). | Do. |
| 9 | Aminodibenz-anthrone. | 3.68 | 120 | ---do--- | Do. |
| 10 | ---do--- | 3.68 | 130 | ---do--- | Do. |
| 11 | ---do--- | 3.68 | 140 | ---do--- | Do. |
| 12 | ---do--- | 3.55 | 125 | ---do--- | Do. |
| 13 | ---do--- | 3.7 | 125 | ---do--- | Do. |
| 14 | ---do--- | 3.88 | 125 | ---do--- | Do. |

EXAMPLE 12

0.1 part of the dyestuff obtained as described below is used as described in Example 1. A grey dyeing of good fastness properties is obtained.

PREPARATION OF THE DYESTUFF 50 parts of a condensation product from 4 molecular proportions of aminodibenzanthrone (nitrogen content=3.58%) and 1 molecular proportion of tetrabromo-pyranthrone (which can be prepared, for example, by the process described in Fiat Final Report 1313, volume II, page 118 for Indanthren Direct Black RB) are added at room temperature with cooling to 200 parts by volume of chlorosulfonic acid and then heated for 2 hours at 130° C. When this internal temperature has been reached, the reaction mixture is maintained for 2 hours at this temperature, while a vigorous current of hydrochloric acid and sulfur dioxide escapes. The heating is then discontinued and the batch is cooled to 80° C. While maintaining the internal temperature at 70 to 80° C., a total of 75 parts by volume of thionyl chloride are then added dropwise. When all thionyl chloride has been dropped in and the internal temperature is raised to 85° C., a weak reflux of thionyl chloride should be noticeable. The batch is kept for about 30 to 40 minutes at 85° C., then cooled, and poured over ice. When decomposition has taken place, the whole is suction-filtered and washed with cold water until the washings run only slightly acid (pH 5 to 6). The resulting sulfochloride is added to a solution of 200 parts of N:N-dihydroxyethyl-propylenediamine-(1:3) in 1000 parts of water with ice-cooling, and the mixture is stirred overnight. On the following morning the reaction mixture is heated for 2 to 3 hours at 50 to 60° C., then cooled to room temperature, and the dyestuff is suctioned off. The filter cake is suspended in methanol and again suction-filtered. The dried dyestuff is added with cooling to 250 parts by volume of sulfuric acid of 100% strength and the mixture is stirred for several hours at 20 to 25° C., then poured over ice, suction-filtered, and the ester is suspended with water and adjusted with NaOH to pH=8.

The dyestuff is suctioned off and dried in a vacuum cabinet at 40 to 50° C.

In the same manner dyeings may be produced with the dyestuffs obtained in a similar manner from the sulfochloride (a) of the condensation product from 3 molecular proportions of aminodibenzanthrone (nitrogen content=3.68%) with 1 molecular proportion of tribromopyranthrone, or (b) of the condensation product from 3 molecular proportions of aminodibenzanthrone (nitrogen content=3.68%) with 1 molecular proportion each of aminoanthraquinone and tetrabromopyranthrone, (c) of the condensation product from 2 molecular proportions of aminodibenzanthrone (nitrogen content=3.68%) with 2 molecular proportions of 1-amino-4-anilidoanthraquinone and 1 molecular proportion of tetrabromopyranthrone, or (d) of the condensation product from 2 molecular proportions of aminodibenzanthrone (nitrogen content=3.68%), and 1 molecular proportion each of 1-amino-anthraquinone, and 1-amino-4-anilidoanthraquinone and tetrabromopyranthrone.

as well as the corresponding dyestuffs obtained from the sulfochlorides of the above-mentioned condensation products by condensation with N-methyl-N-hydroxyethyl-propylenediamine and esterification with sulfuric acid monohydrate. Grey shades of good fastness properties are obtained.

EXAMPLE 13

1.0 part of the dyestuff of the probable formula

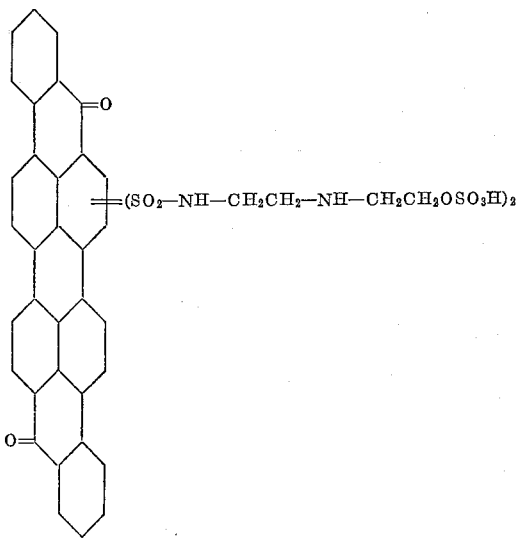

are dissolved in 50 parts of water with addition of 3 to 5 drops of sodium hydroxide solution of 30% strength, and this solution is used as described in Example 1. A strong, reddish blue dyeing of excellent fastness properties is obtained.

The above dyestuff can be prepared by condensing iso-dibenzanthrone - disulfochloride with 2 - (β - aminoethylamino)-ethanol and esterifying the resulting product with concentrated sulfuric acid.

Dyeing may be performed in a similar manner with the dyestuffs obtained by condensing a sulfochloride in column I of the following table with an amine in column II, condensing the resulting chloroalkylamide with an amine in column III and then esterifying the product with sulfuric acid. The shades produced are listed in column IV.

| | I | II 1st amine | III 2nd amine | IV |
|---|---|---|---|---|
| 1 | Isodibenzanthronedisulfochloride. | $NH_2-CH_2CH_2Cl$ | $NH_2-CH_2CH_2OH$ | Blue. |
| 2 | ....do.... | $CH_3$<br>$\|$<br>$NH-CH_2CH_2Cl$ | $NH_2-CH_2CH_2OH$ | Do. |
| 3 | Dibenzanthronedisulfochloride. | $NH_2-CH_2CH_2Cl$ | $NH_2-CH_2CH_2OH$ | Navy. |
| 4 | ....do.... | $CH_3$<br>$\|$<br>$NH-CH_2CH_2Cl$ | $NH_2-CH_2CH_2OH$ | Do. |

EXAMPLE 14

0.5 part of the dyestuff which in the form of its free acid probably corresponds to the formula

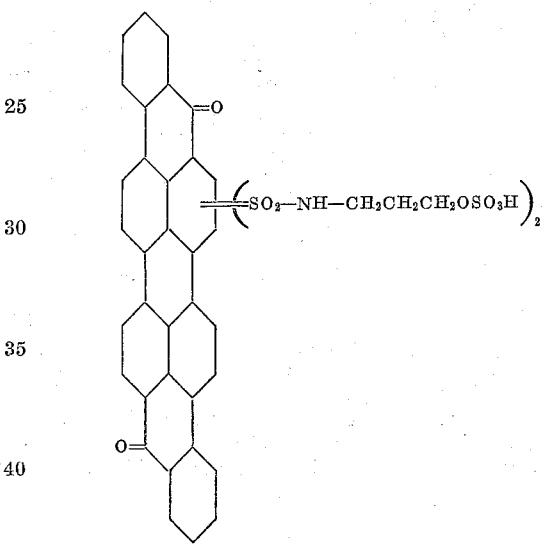

is used as described in Example 1. A violet dyeing is obtained which has excellent properties of fastness.

The dyestuff can be prepared by condensing isodibenzanthrone-disulfochloride with 3-aminopropanol and esterifying the resulting product with concentrated sulfuric acid.

Dyeing may be performed in a similar manner with the dyestuffs obtained by condensing the sulfochloride of a vat dyestuff listed in column I of the following table with the same amine, followed by identical esterification. The shades obtained are shown in column II.

| | I | II |
|---|---|---|
| 1 | Acedianthrone | Brown. |
| 2 | Perylenetetracarboxylic acid-diphenylimide | Red. |
| 3 | 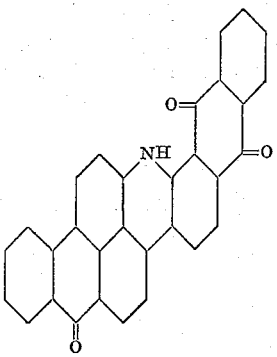 | Olive. |

| I | II |
|---|---|
| 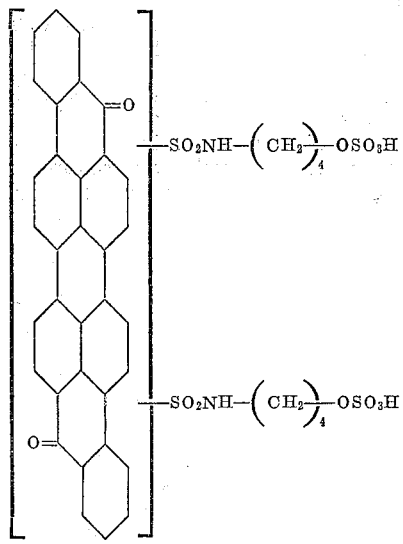 | Golden yellow. |

4 ........

What is claimed is:
1. A process for dyeing and printing cellulose-containing textile materials, wherein there is used a vat dyestuff which contains at least one sulfonic acid amide group of which the nitrogen atom is bound to an aliphatic chain which contains a sulfuric acid semi-ester group and at least three carbon atoms between the sulfuric acid semi-ester group and the amide nitrogen atom, and the dyestuff is reduced to the leuco form and applied to the material as leuco-compound which is then reoxidized on the fiber.

2. Process for dyeing and printing cellulose-containing textile materials with a vat dyestuff which contains at least one substituent of the formula

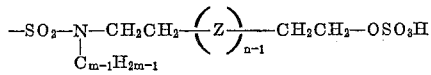

in which $n$ and $m$ each represents a whole positive number up to and including two and $Z$ represents a member selected from the group consisting of the —$CH_2$—, the

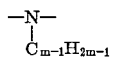

the

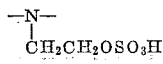

the

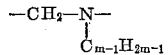

and the

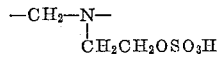

groups, the process being carried out in the presence of an alkali and a reducing agent and the dyestuff leuco compound being then reoxidized on the fiber.

3. Process for dyeing and printing cellulose-containing textile materials with a dibenzanthrone vat dyestuff which contains at least one sulfonic acid amide group whose nitrogen atom bears an aliphatic chain of at least 4 and at most 7 carbon atoms, which chain contains a sulfato group, the process being carried out in the presence of an alkali and a reducing agent and the dyestuff leuco compound being then reoxidized on the fiber.

4. Process for dyeing and printing cellulose-containing textile materials with a isodibenzanthrone vat dyestuff which contains at least one sulfonic acid amide group whose nitrogen atom bears an aliphatic chain of at least 4 and at most 7 carbon atoms, which chain contains a sulfato group, the process being carried out in the presence of an alkali and a reducing agent and the dyestuff leuco compound being then reoxidized on the fiber.

5. The process of claim 3 wherein an aminodibenzanthrone is used.

6. Process for dyeing and printing cellulose-containing textile materials with a benzoylaminoanthraquinone vat dyestuff which contains at least one sulfonic acid amide group whose nitrogen atom bears an aliphatic chain of at least 4 and at most 7 carbon atoms, which chain contains a sulfato group, the process being carried out in the presence of an alkali and a reducing agent and the dyestuff leuco compound being then reoxidized on the fiber.

7. Process for dyeing and printing cellulose-containing textile materials with a condensation product of an aminodibenzanthrone with tetrabrompyranthrone which contains at least one sulfonic acid amide group whose nitrogen atom bears an aliphatic chain of at least 4 and at most 7 carbon atoms, which chain contains a sulfato group, the process being carried out in the presence of an alkali and a reducing agent and the dyestuff leuco compound being then reoxidized on the fiber.

8. The process for dyeing and printing cellulose fibers with the dyestuff of the formula

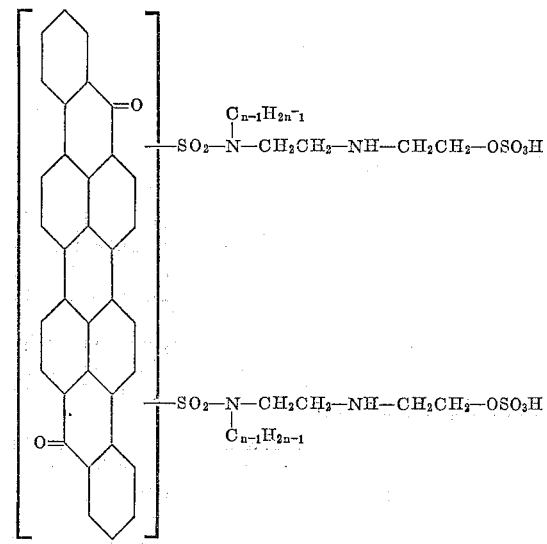

in the presence of an alkali and a reducing agent and the dyestuff leuco compound being then reoxidized on the fiber.

9. The process for dyeing and printing cellulose fibers with the dyestuff of the formula in which $n$ is 1–3, in the presence of an alkali and a reducing agent and the dyestuff leuco compound being then reoxidized on the fiber.

10. The process for dyeing and printing cellulose fibers with the dyestuff of the formula

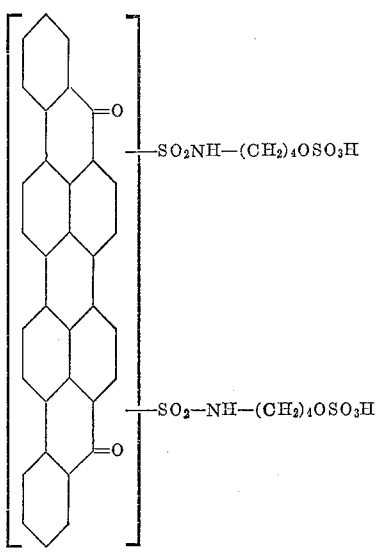

in the presence of an alkali and a reducing agent and the dyestuff leuco compound being then reoxidized on the fiber.

11. The process for dyeing and printing cellulose fibers with the dyestuff of the formula

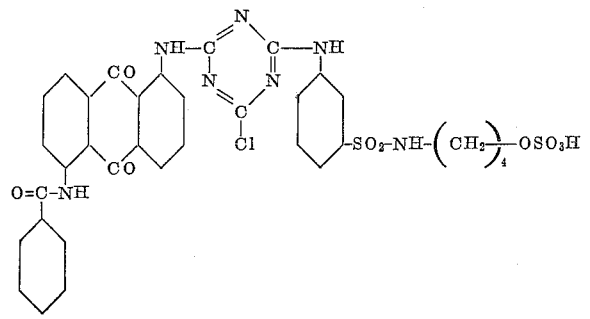

in the presence of an alkali and a reducing agent and the dyestuff leuco compound being then reoxidized on the fiber.

12. The process for dyeing and printing cellulose fibers with the dyestuff of the formula

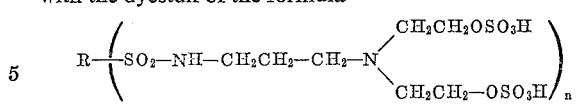

in which R is the radical of the aminodibenzanthrone having a nitrogen content of 3.68%, and $n$ a whole positive number up to 2, the process being carried out in the presence of an alkali and a reducing agent and the dyestuff leuco compound being then reoxidized on the fiber.

13. The process for dyeing and printing cellulose fibers with the dyestuff of the formula

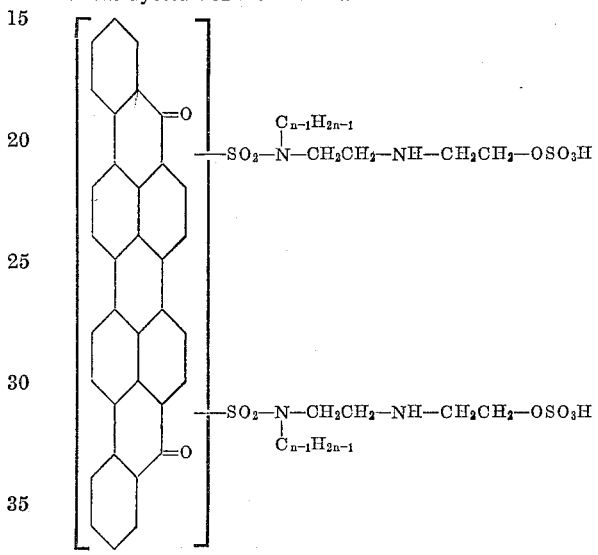

in which $n$ is 1–3, in the presence of an alkali and a reducing agent and the dyestuff leuco compound being then reoxidized on the fiber.

References Cited in the file of this patent
UNITED STATES PATENTS

| | | |
|---|---|---|
| 2,576,847 | Mecco | Nov. 27, 1951 |
| 2,895,785 | Alsberg et al. | July 21, 1959 |
| 2,995,412 | Kleb | Aug. 8, 1961 |
| 3,022,304 | Staeuble et al. | Feb. 20, 1962 |
| 3,029,236 | Staeuble et al. | Apr. 10, 1962 |
| 3,066,005 | Wedemeyer et al. | Nov. 27, 1962 |